Fig. 3.

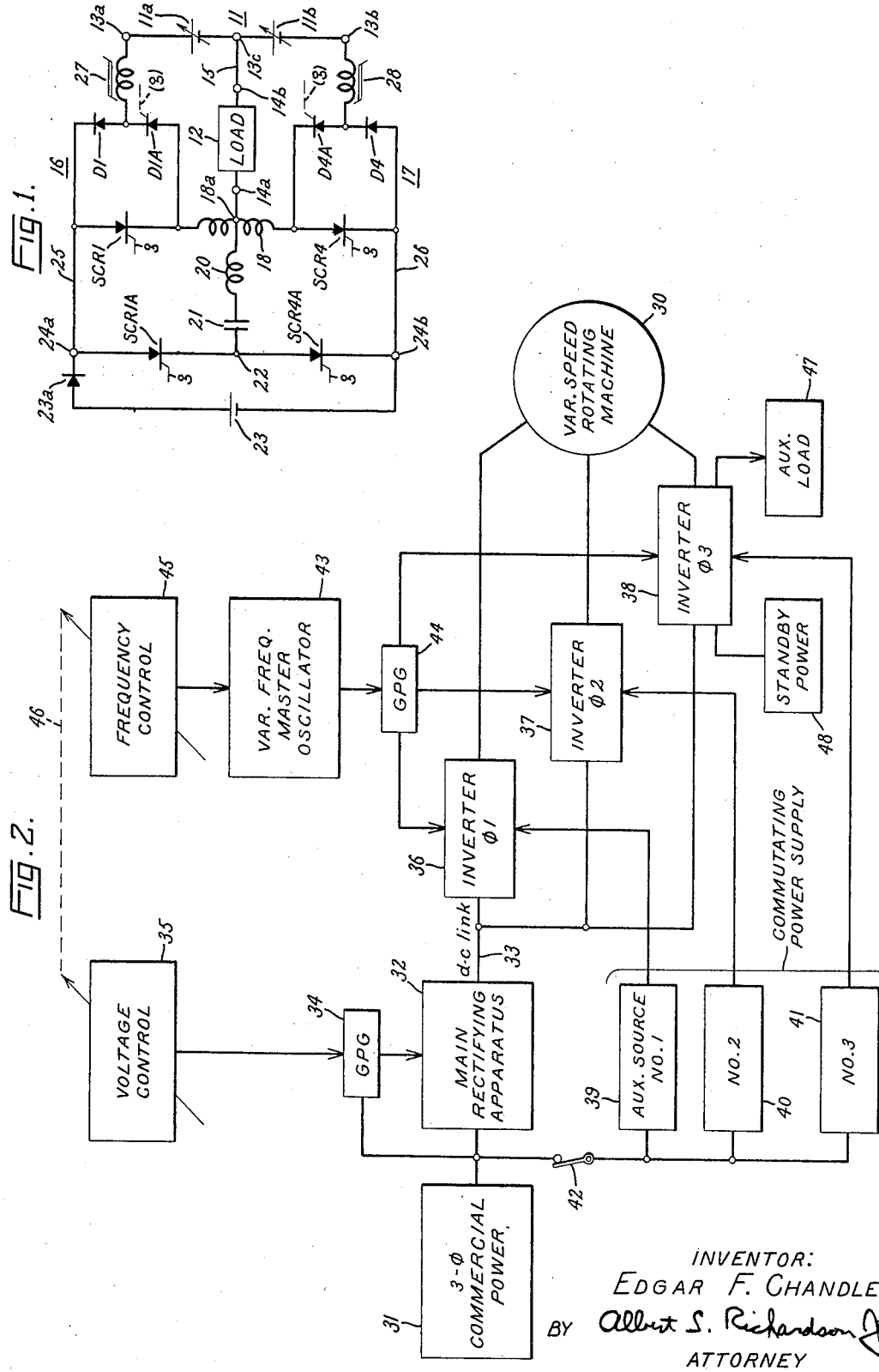

United States Patent Office 3,474,320
Patented Oct. 21, 1969

3,474,320
VARIABLE FREQUENCY AND VOLTAGE ELECTRIC POWER INVERTER UTILIZING AN AUXILIARY SOURCE OF FIXED-MAGNITUDE COMMUTATING VOLTAGE
Edgar F. Chandler, Media, Pa., assignor to General Electric Company, a corporation of New York
Filed Nov. 2, 1967, Ser. No. 680,230
Int. Cl. H02m 7/42
U.S. Cl. 321—5
19 Claims

ABSTRACT OF THE DISCLOSURE

In order to supply alternating voltage of widely variable magnitude and frequency, a variable frequency impulse-commutated inverter is provided with a main source of variable magnitude DC voltage and a separate source of commutating voltage, the magnitude of which is relatively fixed, and the commutating circuitry includes auxiliary controlled rectifiers which engender an operating mode that limits the transfer of electric energy from the commutating source to the main source.

---

This invention relates to means for converting electric power from direct (DC) to alternating (AC) form, and more particularly it relates to an improved static inverter capable of supplying AC load apparatus with a voltage whose magnitude and frequency can be widely varied.

Electric power inversion can be practically accomplished by appropriately controlling the operations of a plurality of switching elements in alternative paths of load-current conduction between DC input (source) terminals and AC output (load) terminals of the inverter. The switching elements may comprise, for example, electric valves of the kind having the ability to hold off forward voltage until turned "on" by a suitable control or gate signal. One family of such valves is generally known by the names "controlled rectifier" or "thyristor," and I prefer to use this family in the present invention.

A controlled rectifier is an unidirectionally conducting device that has an anode and a cathode and is provided with means for initiating conduction between these electrodes on receipt of a predetermined control signal. When its anode and cathode are externally connected in series with an electric power load and a source of forward anode voltage (i.e., anode potential is positive with respect to cathode), a controlled rectifier will ordinarily block appreciable load current until a control signal (gate pulse) above a small threshold value is applied thereto, whereupon it abruptly switches from a high-resistance to a very low-resistance, forward conducting (turned on) state. The controlled rectifier is said to be triggered or "fired" by the control signal. Load current conduction will then continue until subsequently extinguished by the commutating action of external circuit components. The device can be turned off by reducing anode current below a minimum magnitude known as the holding level, or by diverting it from the rectifier by operatively connecting thereacross a suitable source of reverse anode-to-cathode voltage.

There are many different circuit configurations and operating modes for inverters wherein controlled rectifiers are used as the main switching elements. By cyclically turning on and off the respective rectifiers in a predetermined sequence, an AC output voltage is derived from the DC power that is supplied to the inverter input terminals. Any such inverter has to include suitable means for reliably turning off each controlled rectifier at the conclusion of its prescribed interval of load-current conduction and for insuring complete transfer of current from that "outgoing" rectifier to the next-conducting controlled rectifier (the "incoming" rectifier), which transfer is called "commutation."

One well known family of inverter circuits employs "impulse commutation." A detailed explanation of impulse-commutated inverters is set forth in chapter 7, pages 165–230 of the Principles of Inverter Circuits by B. D. Bedford and R. G. Hoft, published in 1964 by John Wiley & Sons, New York, N.Y. For now it is sufficient to point out that impulse commutation is advantageous in any application where static inverters are required to operate over a wide range of frequencies, such as variable speed AC motor drives, and for this reason I use it in the present invention.

Often a variable speed AC motor has to develop substantially constant torque over at least the initial part of its full range of speeds. Toward this end the variable frequency power supply for the motor should be characterized by a voltage magnitude that can vary directly with frequency. One prior art technique for accomplishing this desired result is to supply an inverter with DC voltage whose magnitude is varied proportionately and substantially concurrently with variations in the operating frequency of the inverter. See U.S. Patent 2,784,365—Fenemore et al., for example. Such a technique is advantageous in that the harmonic content of the resulting AC output voltage remains substantially constant over the full range of magnitude variations.

Reliable commutation is difficult to obtain in an impulse-commutated static inverter whose DC input voltage is variable over a wide range of magnitudes. At the lowest input magnitude there may be insufficient energy to ensure successful commutation of rated load current. One theoretical solution to this problem is to use an independent source of commutating power having a substantially fixed voltage magnitude. See for example U.S. Patent 3,273,046—Bedford, granted on September 13, 1966, and assigned to the General Electric Company. However, insofar as I am presently aware, all practical attempts in the high-power inverter art to maintain constant commutating ability over a wide voltage range have heretofore suffered from one or more of the following shortcomings:

Low efficiency,
Large and expensive components,
Relatively complex power circuits.

Accordingly, my general objective is to provide a novel static inverter that is both practical and economical to manufacture and to operate and that is characterized by all of the following desirable features:

High efficiency,
Wide frequency and voltage capabilities,
Constant output waveform,
Reliable commutation.

In carrying out my invention in one form, at least one pair of alternately triggered main controlled rectifiers is connected between a source of variable-voltage DC electric power and a load apparatus, whereby the load apparatus is energized by alternating voltage whose frequency is determined by the triggering frequency of the main controlled rectifiers. A plurality of main load-current conducting uncontrolled rectifiers (diodes) are connected in series with the main controlled rectifiers, respectively, and each set of series-connected controlled and uncontrolled rectifiers is shunted by a feedback diode poled in opposition thereto. In one aspect of my invention, feedback controlled rectifiers are used in lieu of diodes.

For commutating the main controlled rectifiers, an impulse forming series inductance-capacitance circuit is provided. This circuit receives energy from an auxiliary source of relatively fixed-voltage DC electric power to which it is connected by first and second alternately triggered commutating controlled rectifiers. To complete the inverter circuitry, I provide conductive means, including the aforesaid inductance-capacitance circuit, for serially interconnecting the first commutating controlled rectifier and a first one of the main controlled rectifiers and for serially interconnecting the second commutating controlled rectifier and the other main controlled rectifier, whereby load current conduction by either main controlled rectifier will be extinguished in response to triggering the associated commutating controlled rectifier.

With this arrangement, the ability to commutate rated load current in the main controlled rectifiers is essentially independent of the voltage magnitude of the first-mentioned source of power. Furthermore, the inverter mechanism is relatively simple and highly efficient. There is little chance for commutating energy to be drained by the main power source, and any such tendency is effectively suppressed in another aspect of my invention by inserting saturable reactors between the main power source and the main rectifiers.

My invention will be better understood and its various objects and advantages will be more fully appreciated from the following description taken in conjunction with the accompanying drawings in which:

FIG. 1 is a schematic circuit diagram of a single-phase electric power inverter embodying my invention;

FIG. 2 is a simplified block diagram of a 3-phase electric power conversion system illustrating a practical application of the invention; and FIG. 3 is a schematic diagram of the power circuits shown in block form in FIG. 2.

Referring now to FIG. 1, a main source 11 of DC electric power is connected to AC load apparatus 12 by means of an electric power inverter embodying my invention. The main source 11 is shown as a pair of series-connected, variable voltage batteries 11a and 11b that form a center-tapped supply for energizing a set of three input terminals 13a, 13b, and 13c. The load 12, shown symbolically in FIG. 1, is connected across the inverter's output or load terminals 14a and 14b.

The input terminals 13a, 13b, and 13c and the output terminals 14a and 14b are interconnected by circuit means including a conductor 15 and complementary first and second load-current conducting paths 16 and 17. The conductor 15 is connected directly between the neutral input terminal 13c and the output terminal 14b. The first path 16, which includes a main controlled rectifier SCR1 connected in series with a main uncontrolled rectifier D1 (also referred to as a diode), is connected between the relatively positive input terminal 13a and the output terminal 14a. A unidirectionally conducting device D1A (hereinafter referred to as a feedback diode) is connected across the series combination of SCR1 and D1 in opposed polarity, parallel circuit relationship therewith. The second load-current conducting path 17, also including a main controlled rectifier SCR4 in series with a main uncontrolled rectifier D4, is employed to connect the same output terminal 14a to the relatively negative input terminal 13b. Another feedback diode D4A has been connected across SCR4 and D4 in opposed polarity, parallel circuit relationship therewith.

As is shown in FIG. 1, a center tapped $di/dt$ limiting reactor 18 can also be included in the complementary paths 16 and 17 if desired. The closely coupled windings of this reactor are connected to the cathode of SCR1 and to the anode of SCR4, respectively, and their common junction forms an intermediate point 18a that is connected directly to the inverter output terminal 14a.

It is apparent in FIG. 1 that with the controlled rectifier SCR1 in a forward conducting state, the first path 16 will permit the upper branch 11a of the main DC source 11 to supply source current to the load 12 in a given forward direction, while the second path 17 (with the controlled rectifier SCR4 in its forward conducting state) will enable source current to flow from the lower branch 11b of the main source to the load in the opposite or reverse direction. Therefore, by controlling the main controlled rectifiers SCR1 and SCR4 so that their respective intervals of conduction recur alternately, the inverter will operate to develop at its output terminal an alternating voltage of generally rectangular wave form whose magnitude is determined by the voltage magnitude of the main source 11. This magnitude is made variable over a wide range (e.g., 0–400 volts).

The main controlled rectifiers SCR1 and SCR4 are alternately switched from blocking (high resistance) to forward conducting (negligible resistance) states by sequentially supplying predetermined turn-on control signals to their respective gates "g." The rate at which this switching action occurs, and hence the frequency of the inverter output power, will be determined by the frequency of the turn-on control signals which is variable over a wide range (e.g., 0–200 Hz.). In order to extinguish forward conduction in SCR1 just prior to turning on the companion SCR4, and vice versa, impulse commutating means has been provided and will next be described.

The commutating means includes an inductor 20 and a capacitor 21 which are connected in series with each other to form an oscillatory circuit. The parameters of this oscillatory circuit are selected so that its natural frequency is appreciably higher than the highest frequency at which the turn-on control signals are supplied to SCR1 and SCR4. A natural frequency as high as 9,300 Hz. is possible in practice. As can be seen in FIG. 1, one end of the oscillatory circuit 20–21 is connected to the intermediate point 18a of the load-current conducting paths, and the other end is connected to the juncture 22 of a pair of alternately triggered, series-connected commutating control rectifiers SCR1A and SCR4A.

Commutating power is provided by an auxiliary source 23 of DC electric power to which a second set of inverter input terminals 24a and 24b is connected. In FIG. 1 auxilary source 23 is depicted as a battery having a relatively fixed voltage. Where constant commutating ability is desired over the whole voltage range of the main source 11, the voltage magnitude of the battery 23 should be equal to or higher than the highest magnitude to which the voltage of the main source can be varied. But it is also possible, and in some applications desirable, to use a lower voltage auxiliary source, in which event a blocking diode 23a is connected in series therewith and commutating power will be derived from the main source when its voltage has been raised above a predetermined minimum level that equals the fixed voltage magnitude of battery 23.

The input terminals 24a and 24b of the illustrated inverter are electrically connected to the oscillatory circuit 20, 21 by way of the commutating control rectifiers SCR1A and SCR4A. The mode of the first commutating control rectifier SCR1A is connected to the relatively positive input terminal 24a so that the juncture 22 is energized by the positive pole of the auxiliary source 23 when SCR1A is in a forward conducting state, while the cathode of the second commutating controlled rectifier SCR4A is connected to the relatively negative input terminal 24b so that the same juncture 22 is energized by the negative pole of 23 when SCR4A is in its forward conducting state. A conductor 25 spans the anodes of the main and commutating controlled rectifiers SCR1 and SCR1A, respectively, and thus these rectifiers and the oscillatory circuit 20–21 are conductively interconnected in series with one another. SCR1A is poled oppositely to SCR1. Similarly, a conductor 26 spans the cathodes of the main and commutating controlled rectifiers SCR4 and SCR4A, respectively, which are thereby conductively interconnected in opposed polarity, series circuit relationship with each other and with the same oscillatory circuit.

Although not shown in FIG. 1, it is often desirable to connect conventional $di/dt$ limiting means between the commutating controlled rectifiers SCR1A and SCR4A, and to connect $dv/dt$ suppressing means, popularly known as a snubber circuit, in parallel with each of these rectifiers. A snubber circuit (not shown) can also be connected across each of the main controlled rectifiers SCR1 and SCR4 if necessary.

The first and second commutating controlled rectifiers SCR1A and SCR4A are alternately switched from blocking to forward conducting states by sequentially supplying predetermined "turn-off" control signals to their respective gates "g." The term "turn-off" is used because the resulting switching action functions to extinguish forward conduction by the associated main controlled rectifier. The respective turn-off control signals should recur in synchronism with and slightly in advance of the turn-on control signals for the opposite main controlled rectifiers. More specifically, these control or trigger signals are programmed to cause the various controlled rectifiers to switch to their forward conducting states in the following repetitive order:

SCR1
SCR1A
SCR4
SCR4A

The time that elapses between initiating switching of SCR1A and initiating switching of SCR4 is kept very short (e.g., 45 microseconds) and can remain nearly constant over the full range of inverter operating frequencies. The same short, constant time delay obtains between the switching of SCR4A and SCR1.

Because the theory and design criteria of the impulse commutating means that is used in the FIG. 1 embodiment of my invention are well known in the art, they will not be repeated here. If the reader needs more information, he can refer to pages 167–184 of the above-cited book, Principles of Inverter Circuits, and to U.S. Patent 3,207,974—McMurray, granted Sept. 21, 1965, and assigned to the General Electric Company. The operation of this commutation means for one cycle of inverter operation will now be briefly summarized.

Initially a steady state condition is assumed wherein only D1 and SCR1 are conducting. The capacitor 21 is fully charged with the potential of juncture 22 being negative with respect to the intermediate point 18a. An inductive load is assumed. The commutating controlled rectifier SCR1A receives a turn-off control signal at time $t_1$, and in response thereto it switches to a forward conducting state, thereby enabling the capacitor 21 to discharge through inductor 20, the upper half of the reactor 18, the feedback diode D1A, the main diode D1, and the conductor 25. Quickly the magnitude of the capacitor discharge current rises above that of load current (which remains substantially constant throughout the commutating transient), whereupon forward current in the main controlled rectifier SCR1 is reduced to zero. The capacitor 21 proceeds to discharge completely and then recharge with opposite polarity, and current in the oscillatory circuit 20, 21 remains higher than load current for a sufficient length of time to ensure successful turn-off of SCR1.

Shortly after the outgoing main controlled rectifier SCR1 has been turned off and while some current still flows in feedback diode D1A, a turn-on control signal is supplied to the complementary main controlled rectifier SCR4. At this time ($t_2$), the latter device begins conducting in its forward direction, and current is commutated from the upper half to the lower half of the reactor 18, whereupon the feedback diode D1A and the main diode D1 stop conducting. The capacitor 21 is now recharged by the auxiliary power supply 23 which contributes charging current through SCR1A, the oscillatory circuit 20, 21, the lower half of reactor 18, SCR4, and the conductor 26. Current in the oscillatory circuit will naturally oscillate to zero, whereupon SCR1A reverts to its nonconducting state and the capacitor 21 is fully charged. The potential of juncture 22 is now positive with respect to 18a.

Before SCR1A turns off, the decaying current pulse in the oscillatory circuit 20, 21 falls below the level of load current, at which time the main controlled rectifier SCR4 stops conducting and the feedback diode D4A begins to assume forward load current conduction. Subsequently the main current reverses direction in the load apparatus 12, and SCR4 resumes conduction. It is obvious that the turn-on control signal for SCR4, which signal was initiated at time $t_2$, must again be available when load current reverses.

Reverse load current continues flowing through the main controlled rectifier SCR4 until time $t_3$ when a turn-off control signal is supplied to the associated commutating controlled rectifier SCR4A. At this time SCR4A switches to its forward conducting state, and in a manner similar to that previously described forward conduction by SCR4 is consequently extinguished. After a short time delay, the next turn-on control signal is supplied to the main controlled rectifier SCR1. Now the capacitor 21 becomes fully recharged by a pulse of current flowing from the auxiliary power source 23 through the conductor 25, SCR1, the oscillatory circuit 20, 21, and SCR4A, and the latter device turns off. Load current will traverse the feedback diode D1A until resuming its given forward direction through D1 and SCR1. This corresponds to the initially assumed conditions. The period of the complete operating cycle varies inversely with the frequency at which the control signals are supplied.

Several distinct advantages of my invention will now be apparent. Whenever its variable supply voltage is below a minimum level determined by the fixed voltage magnitude of the auxiliary source 23, the commutating ability of the inverter is independent of the main power source 11, and therefore rated load current can be reliably commutated even when the voltage magnitude of the main source is decreased to zero. The commutating and load current circuits are conductively interconnected, thereby eliminating the need for relatively large and expensive magnetic coupling means. Both of these advantages have been obtained without sacrificing efficiency. By providing the commutating controlled rectifiers SCR1A and SCR4A and operating them in the mode described, I limit the opportunity for electric energy to transfer to the main source 11 of DC power from either the auxiliary source 23 or the energy storing components of the oscillatory circuit 20, 21. Consequently the size of the auxiliary source is minimized, and there is little need to provide means for harmlessly (but inefficiently) dissipating the transferred energy.

During each commutating interval of my inverter, there is only one brief moment when power may be transmitted from the auxiliary source 23 to the main source 11. This condition begins when the incoming main controlled rectifier is first triggered and ends as soon as the main diode associated with the outgoing main controlled rectifier stops conducting. In other words, it embraces the time required to commutate current from one half of the reactor 18 to the other. During this overlap time, the main source 11 can undesirably drain energy from the auxiliary source 23 and from the oscillatory circuit 20, 21 via a low-impedance circuit that includes in series combination the incoming main controlled rectifier and its feedback diode.

In order to minimize overlap time, the reactor 18 is designed to have as low inductance as possible, or it is omitted altogether if the switching characteristics of the main controlled rectifiers permit. In order to impede any current that may tend to flow from the auxiliary source 23 through both the incoming main controlled recifier and the associated feedback diode to the main source 11 during the overlap time, I have included a pair of saturable reactors 27 and 28 in the load-current conducting paths 16 and 17, respectively. As is shown in FIG. 1, the first saturable reactor 27 is connected between the relatively positive input terminal 13a of the inverter and the junction of the diodes D1 and D1A, and the second saturable reactor 28 is connected between the relatively negative input terminal 13b and the junction of the diodes D4 and D4A. Each of these reactors is ordinarily in a saturated state and presents negligible impedance to load current supplied by the main source 11 of DC power to which the input terminals 13a and 13b are connected. But it abruptly changes to an unsaturated, high-impedance state before any appreciable amount of current can flow backwards into the main source. Thus the power drain on the auxiliary source 23 is reduced, and there is less variation of voltage across the reactor 18 for commutation as the voltage magnitude of the main source 11 varies. Preferably each saturable reactor is designed with a volt-seconds capability approximately equal to the product of the fixed voltage magnitude of the auxiliary source 23 and the maximum length of overlap time, whereby it successfully accomplishes its intended function without seriously interfering with normal operation of the inverter.

In lieu of the saturable reactors 27 and 28, the feedback diodes D1A and D4A can be converted to controlled rectifiers each of which is triggered a fixed, short time interval (e.g., 8 microseconds) after its associated main control rectifier is triggered. Thus, when the incoming controlled rectifier first switches to its forward conducting state and for a brief time thereafter, the corresponding feedback rectifier effectively interrupts the series circuit that would otherwise transmit power from the auxiliary source 23 to the main source 11.

The feedback controlled rectifiers mentioned in the preceding paragraph also need to be triggered, respectively, when the corresponding commutating controlled rectifiers are triggered. For example, rectifier D1A should be triggered with SCR1A. By introducing a slight delay in this triggering of the feedback controlled rectifiers, a higher reverse voltage will be imposed on the outgoing main controlled rectifier, whereby the turn-off time of the latter device is desirably reduced. Another practical advantage of using controlled rectifiers instead of diodes for the feedback components is their inherent ability to limit to one-half cycle the duration of any abnormal current flow from an active load 12 (e.g., a synchronous motor) in the event of a short circuit across the terminals of the main source 11. It is also well known that the snap-off effect of semi-conductor controlled rectifiers is less severe than that of conventional diodes replaced thereby.

The possibility of using feedback controlled rectifiers has been symbolically illustrated in FIG. 1 by the broken-line gates (g) shown on the devices D1A and D4A. These devices can thus be controlled to commence conducting in delayed response to turn on of the corresponding commutating controlled rectifiers, the period of delay being either fixed or variable, as desired. One obvious way to accomplish this result is to connect a Zener diode between anode and gate, whereby the feedback rectifier is triggered as soon as the magnitude of reverse voltage that the commutating means imposes on the associated main controlled rectifier reaches a predetermined level.

In order to increase the current rating of the inverter beyond the maximum individual capability of either SCR1 or SCR4, it is possible to connect one or more additional pairs of main controlled rectifiers in parallel with the original pair shown in FIG. 1. In such a refinement of my invention a multi-primary load transformer is desirable. One of the primary windings of this transformer can span the input terminal 13c and the intermediate point 18a of FIG. 1, while a companion primary winding can span the terminal 13c and a corresponding intermediate point of a load current carrying circuit formed by serially connecting the second pair of main controlled rectifiers between conductors 25 and 26. An additional oscillatory circuit, comprising a second inductor in series with a second capacitor, will be connected between the latter intermediate point and the juncture 22 of the first and second commutating controlled rectifiers SCR1A and SCR4A. The main and feedback diodes shown in FIG. 1 should have their current ratings increased appropriately, or similar devices should be added in parallel therewith. The first main controlled rectifier of the second pair will be arranged to receive its turn-on control signal substantially simultaneously with that of SCR1, and forward conduction is subsequently extinguished by the commutating action of the additional oscillatory circuit in response to SCR1A switching to its forward conducting state. Similarly, the other main controlled rectifier of the second pair will be arranged to receive its turn-on control signal substantially simultaneously with that of SCR4, and forward conduction is subsequently extinguished by the action of the additional oscillatory circuit in response to SCR4A turning on.

Figure 3:
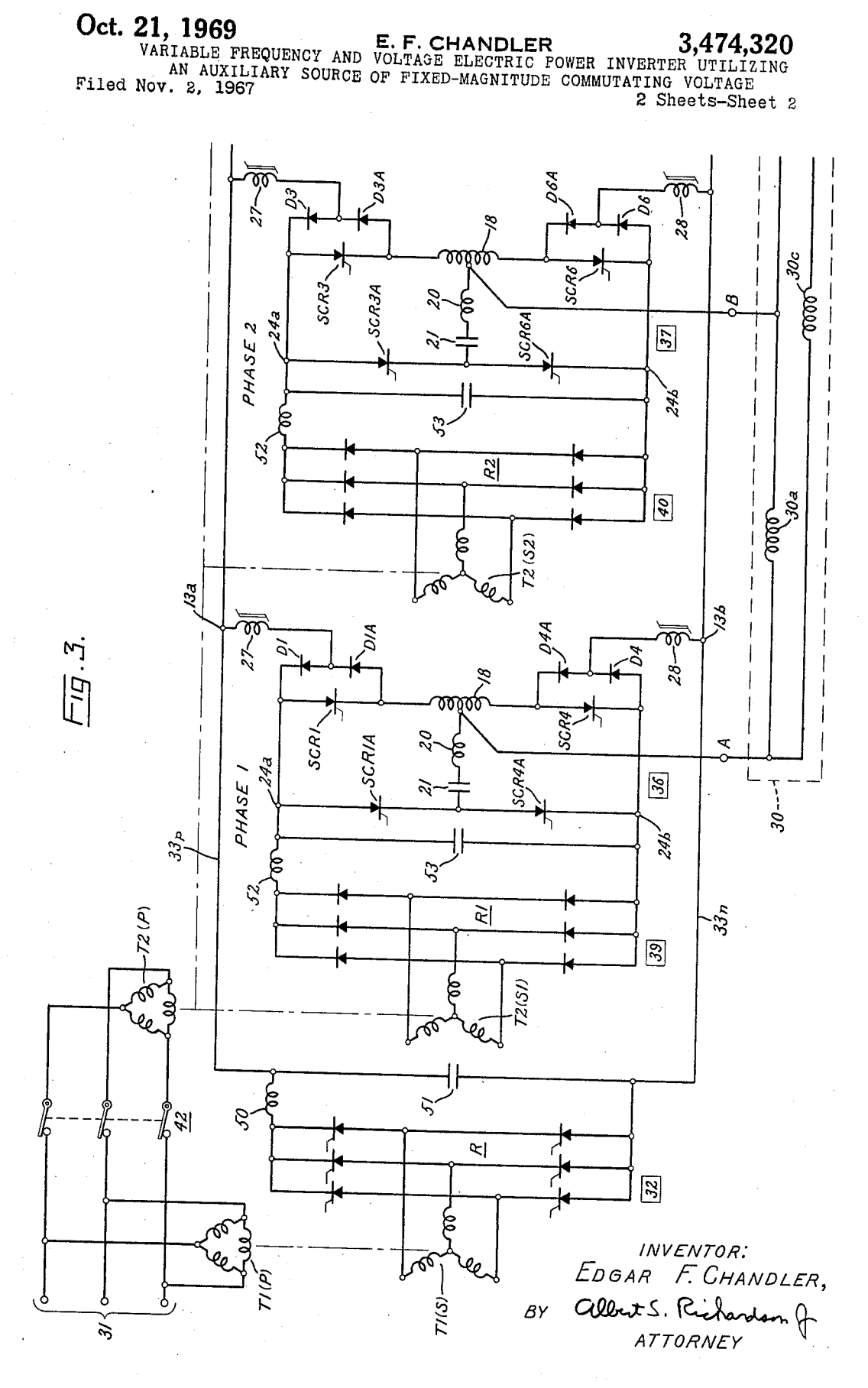

Persons skilled in the art will recognize that the principles of my invention can be practised in a variety of different inverter configurations. FIG. 1 illustrates the circuitry for energizing single-phase AC load apparatus from a center-tapped 3-terminal source of DC power. Preferably the load is connected directly between the inverter output terminals 14a and 14b as shown, but alternatively it could be coupled to these terminals by way of an output transformer. The same basic circuitry can be used in a bridge configuration to energize the load apparatus from a 2-terminal source of power. The same principles can be employed in a center-tapped load transformer configuration. A 3-phase embodiment of the invention for supplying electric power to variable speed AC rotating machinery is illustrated in FIGS. 2 and 3 which will now be described.

FIG. 2 illustrates a system that converts 3-phase AC commercial electric power of substantially constant frequency and voltage magnitude to 3-phase power of simultaneously variable frequency and voltage for driving at least one variable speed AC motor 30. The 3-phase power from the commercial supply 31 is first rectified by main rectifying apparatus 31 which energizes a DC link 33 with a unipolarity output voltage of variable magnitude. Preferably the main rectifying apparatus 32 includes a plurality of controlled rectifiers which are interconnected in a 3-phase double-way bridge configuration (see FIG. 3) and operated in the well-known phase-controlled mode. An associated gate pulse generator 34 of conventional design supplies the respective rectifiers of the apparatus 32 with a properly sequenced train of control signals in synchronism with the AC input voltage, and the average magnitude of the rectified output voltage is determined by the characteristic "delay angle" of this train, which angle can be varied as desired by suitable voltage control means 35. As will be apparent to persons skilled in the art, a DC voltage of variable magnitude could alternatively be supplied by other suitable means, such as, for example, a diode rectifier in conjunction with a variable AC transformer or DC chopper.

The variable voltage DC link 33 serves as a common input for each section of a 3-phase variable-frequency electric power inverter constructed in accordance with my invention. In FIG. 2 the three inverter sections are identified by the reference numbers 36, 37, and 38, and their outputs are respectively connected to phases 1, 2, and 3 of the polyphase stator windings of the motor 30. The internal power circuits of the inverter are shown in FIG. 3 which will soon be described.

The inverter sections 36, 37, and 38 respectively derive their commutating power from three separate auxiliary sources 39, 40, and 41 which provide DC voltage of relatively fixed magnitude. Preferably each of the auxiliary sources comprises a plurality of diodes arranged in a 3-phase double-way bridge whose AC terminals are connected to three isolated sets of secondary windings of a constant voltage delta-star transformer. The primary windings of this transformer are connected to the common 3-phase AC power supply 31 via a disconnect switch 42. These details are also shown in FIG. 3.

Control circuit for 3-phase inverter are shown in FIG. 2 in block form. The block 43 represents a variable-frequency master oscillator of any suitable design. It controls the operation of gating means 44 which is designed to generate trigger signals for the controlled rectifiers of the respective inverter sections 36, 37, and 38 in a predetermined sequence in response to successive oscillations of the master oscillator 43. The gating means 44 can use logic or ring counter or digital or any other well known techniques to program the trigger signals as specified. These signals are therefore produced in a preset sequence (about which more will be said in connection with the description of FIG. 3), but their time rate of recurrence, and hence the operating frequency of the inverter, is determined by the master oscillator frequency which can be varied as desired by suitable frequency control means 45.

Where a constant torque characteristic is desired for the variable speed motor 30, the frequency control means 45 of my system can be ganged with the voltage control means 35, as is shown symbolically in FIG. 2 at 46. Consequently the voltage magnitude of the DC link 33 is varied in unison with variations of the frequency of the trigger signals supplied to the polyphase inverter 36, 37, 38. The controls are appropriately proportioned to maintain the voltage-to-frequency ratio $V/f$ of the power that energizses the motor 30 substantially constant over at least part of the full frequency range thereof. The same result could be alternatively accomplished by using closed-loop regulating means responsive to a $V/f$ error signal for controlling the voltage magnitude of the DC link.

Persons skilled in the art will appreciate that in certain applications a motor is required to run with substantially constant torque at relatively low speeds and to operate with constant horsepower at higher speeds. This result can be obtained by progressively varying the DC link voltage between zero and maximum while the inverter frequency is varied between zero and a given value above which the voltage is maintained nearly constant. Higher starting torque can also be attained by appropriately controlling voltage as frequency is initially advanced from zero.

In accordance with one aspect of my invention, one of the inverter sections shown in FIG. 2 can be used to energize an auxiliary load 47 from a standby source of DC electric power. The auxiliary load 47 may comprise, for example, the commutating circuits of the inverter sections 36, 37, and 38 plus the control power needs of the gating circuits 44. This feature of the invention will be further explained in connection with the following description of FIG. 3.

In FIG. 3 the internal power circuit details of the blocks 32 and 36–41 of the converter system are shown. The main rectifying apparatus 32 is seen to comprise a delta-star power transformer and a phase-controlled 3-phase double-way bridge rectifier. The delta-connected transformer primary windings T1(P) are connected to the mains of the 3-phase commercial power source 31, and the star-connected transformer secondary winding T1(S) are connected to the AC terminals of the bridge R. The relatively positive and negative DC terminals of the bridge R are respectively connected to buses 33p and 33n which comprise the variable voltage DC link 33 of the converter system. A smoothing choke 50 can be connected in series with the positive bus 33p if necessary, and an optional filter capacitor 51 can be connected between the buses 33p and 33n as shown. (Because commutating power is independently supplied, the main source 32 need not be characterized by a "stiff" voltage, and therefore the capacitor 51 can be omitted if the motor specifications permit.) The DC buses 33p and 33n serve as the main source of DC electric power for all three inverter sections 36, 37, 38. The voltage magnitude of this source is determined, as previously explained, by the variable delay angle of the train of control signals that sequentially trigger the controlled rectifier comprising the bridge R.

Each section or phase of the polyphase inverter illustrated in FIG. 3 is a half bridge that embodies the essence of the single-phase inverter of FIG. 1, and therefore the same or similar reference characters have been used. Each inverter section has a common pair of input terminals 13a and 13b and a separate output terminal. As is shown in FIG. 3, the input terminals 13a and 13b are respectively connected to the positive and negative buses 33p and 33n of the common source of variable DC voltage. The output terminals of the three inverter sections 36, 37, and 38 are respectively identified by the letters A, B, and C and in each case correspond to the intermediate point of the $di/dt$ limiting reactor 18 of that section. Spanning the output terminals A, B, and C of the separate inverter sections are the three different phase windings 30a, 30b, and 30c of the AC motor 30. Thus an AC load is operatively connected between the output terminal of each inverter section and the main source of DC power.

For purposes of commutating the main controlled rectifiers in the respective inverter sections 36, 37, and 38, three duplicate auxiliary sources of DC electric power have been provided. Preferably each of the auxiliary sources 39, 40, and 41 comprises a diode bridge that is individually energized by a set of star-connected transformer windings. As is indicated in FIG. 3 (both sheets), three different transformer secondaries T2(S1), T2(S2), and T2(S3) are provided for the respective sources 39, 40, and 41, and all three share a common set of delta-connected primary windings T2(P) which in turn is connected to the 3-phase AC mains by way of the disconnect switch 42. The AC terminals of the 3-phase double-way bridges R1, R2, and R3 are separately connected to these star-connected transformer secondaries, respectively. A smoothing choke 52 and a filter capacitor 53 have been included in the DC output circuit of each auxiliary source as shown.

For driving the AC motor 30 in a given direction, the the control means associated with the polyphase inverter shown in FIG. 3 should supply control signals that are programmed to trigger the various controlled rectifiers in the following sequence:

| Commutating controlled rectifiers | Main controlled rectifiers |
|---|---|
| SCR1A (followed shortly by) | SCR4 |
| SCR2A (followed shortly by) | SCR5 |
| SCR3A (followed shortly by) | SCR6 |
| SCR4A (followed shortly by) | SCR1 |
| SCR5A (followed shortly by) | SCR2 |
| SCR6A (followed shortly by) | SCR3 |

The motor can be driven in the opposite direction by reversing the phase sequence of the inverter output which is accomplished by reversing the sequence of triggering the commutating controlled rectifiers. The control signals for the commutating controller rectifiers should be of short duration (e.g., 60 microseconds), while the control signals for the main controlled rectifiers should be extended. The intervals between triggering the respective commutating controlled rectifiers should be uniform. The frequency of the symmetrical 3-phase output voltage supplied to the windings of AC motor 30 depends on the frequency of these control signals.

The part of FIG. 3 that is shown on the last sheet of the drawings illustrates the manner in which the third inverter section 38 has been used for simultaneously energizing separate load apparatus from a standby source 48 of DC electric power. The standby source as there shown is a battery having a fixed voltage magnitude no higher than that of the commutating voltage source 41. The battery 48 has a center tap which is connected through the center pole of a 3-pole disconnect switch 54 to the right-hand terminal of an output transformer primary winding T3(P). The left-hand terminal of the primary winding T3(P) is connected to the relatively positive pole of the battery 48 by a current-conducting path including the main controlled rectifier SCR5 in series with an additional main uncontrolled rectifier D5', a saturable reactor 27', and the disconnect switch 54. This path enables auxiliary load current to flow from the battery 48 in a given forward direction with respect to the output transformer when a turn-on control signal is supplied to SCR5. As can be seen in FIG. 3, the series-connected controlled rectifier SCR5 and uncontrolled rectifier D5' are shunted by a feedback diode D5A' poled in opposition thereto. The left-hand terminal of the transformer primary T3(P) is additionally connected to the relatively negative pole of the battery 48 by a current-conducting path including the complementary main controlled rectifier SCR2 in series with another main uncontrolled rectifier D2', a saturable reactor 28', and the disconnect switch 54, whereby auxiliary load current can flow from the battery 48 in the reverse direction with respect to the output transformer when a turn-on control signal is supplied to SCR2. The series-connected controlled rectifier SCR2 and uncontrolled rectifier D2' are shunted by an additional feedback diode D2A' which is poled oppositely thereto.

The output transformer is provided with at least one center-tapped secondary winding T3(S) which is adapted to be connected to the auxiliary load 47. This load (not shown in FIG. 3) may comprise rectifying apparatus for converting the transformer secondary voltage to constant DC voltage which energizes the input terminals 24a and 24b of the respective inverter sections 36, 37, and 38 in the event of a temporary failure of the commercial power source 31, whereby the inverter can continue operating while the motor 30 coasts until normal power is restored.

While I have shown and described preferred forms of my invention by way of example, other modifications will probably occur to those skilled in the art. I therefore intend herein to cover all such modifications which fall within the true spirit and scope of my invention.

What I claim as new and desire to secure by Letters Patent of the United States is:

1. Electric power supply means for energizing AC electric load apparatus comprising:
    (a) a first set of input terminals adapted to be connected to a main source of DC electric power,
    (b) at least one pair of main controlled rectifiers each being switchable to a forward conducting state on receipt of a predetermined turn-on control signal;
    (c) at least two main uncontrolled rectifiers;
    (d) complementary first and second load-current conducting paths connected between said first set of input terminals and the AC load apparatus, said first path including a first one of said control rectifiers connected in series with a first one of said main uncontrolled rectifiers and being arranged to conduct load current in a given forward direction with respect to the apparatus when a turn-on control signal is supplied to said first main controlled rectifier, said second path including a second main controlled rectifier connected in series with another main controlled rectifier and being arranged to conduct load current in the reverse direction with respect to the apparatus when a turn-on control signal is supplied to said second main controlled rectifier;
    (e) at least two feedback rectifiers respectively shunting the series-connected main rectifiers in said first and second paths, each feedback rectifier being poled oppositely to the main rectifiers that it shunts;
    (f) a second of input terminals adapted to be connected to an auxiliary source of DC electric power;
    (g) a capacitor connected in series with at least one inductor to form oscillatory circuit means having a natural frequency that it higher than the highest frequency at which the turn-on control signals are supplied;
    (h) at least first and second commutating controlled rectifiers each being switchable to a forward conducting state on receipt of a predetermined turn-off control signal;
    (i) means including said first and second commutating controlled rectifiers for electrically connecting said second set of input terminals to said capacitor which consequently is energizable by said auxiliary source of power when either one of said commutating controlled rectifiers is in a forward conducting state;
    (j) means for serially interconnecting said first commutating controlled rectifier, said oscillatory circuit means, and said first main uncontrolled rectifier so that forward conduction by said first main controlled rectifier will be extinguished in response to said first commutating controlled rectifier switching to its forward conducting state; and
    (k) means for serially interconnecting said second commutating controlled rectifier, said oscillatory circuit means, and said second main uncontrolled rectifier so that forward conduction by said second main controlled rectifier will be extinguished in response to said second commutating controlled rectifier switching to its forward conducting state.

2. The power supply means of claim 1 in which said first and second load current conducting paths respectively include first and second saturable reactors each of which is disposed to impede any current that may tend to flow between said auxiliary source and said main source of DC power through the combination of a main controlled rectifier and corresponding feedback rectifier.

3. The power supply means of claim 1 including means for energizing other electric load apparatus from a standby source of DC electric power, comprising:
    (l) a third set of input terminals adapted to be connected to the standby source of power;
    (m) output circuit means adapted to be connected to the other lead apparatus;
    (n) two additional uncontrolled rectifiers;
    (o) complementary third and fourth current conducting paths interconnecting said third set of input terminals and said output circuit means, said third path including a first one of said additional uncontrolled rectifiers connected in series with said first main controlled rectifier and said fourth path including the other additional uncontrolled rectifier connected in series with said second main controlled rectifier; and
    (p) two additional feedback rectifiers shunting the series-connected controlled and uncontrolled rectifiers in said third and fourth paths, respectively, each of said additional feedback rectifiers being poled oppositely to the series-connected rectifiers that it shunts.

4. Electric power supply means for energizing AC electric load apparatus comprising:
    (a) a first set of input terminals adapted to be connected to a main source of DC electric power;
    (b) at least one pair of main controlled rectifiers each being switchable to a forward conducting state on receipt of a predetermined turn-on control signal;
    (c) a plurality of main uncontrolled rectifiers connected in series with said main controlled rectifiers, respectively;

(d) means including all of said main rectifiers for electrically connecting said first set of input terminals to the AC load apparatus in a manner whereby alternating current can be supplied to the connected apparatus by supplying turn-on control signals to said main controlled rectifiers in a predetermined sequence;

(e) a second set of input terminals adapted to be connected to an auxiliary source of DC electric power;

(f) an inductor and a capacitor connected in series with each other to form an oscillatory circuit having a natural frequency that is higher than the highest desired frequency of said alternating current;

(g) at least first and second commutating controlled rectifiers each being switchable to a forward conducting state on receipt of a predetermined turn-off control signal;

(h) means including said first and second commutating control rectifiers for electrically connecting said second set of input terminals to said oscillatory circuit which consequently is energizable by said auxiliary source of power when either one of said commutating controlled rectifiers is in a forward conducting state;

(i) means for serially interconnecting said first commutating control rectifier, said oscillatory circuit, and a first one of said main controlled rectifiers so that forward conduction by the latter will be extinguished in response to said first commutating controlled rectifier switching to its forward conducting state; and (j) means for serially interconnecting said second commutating controlled rectifier, said oscillatory circuit, and another main controlled rectifier so that forward conduction by the latter will be extinguished in response to said second commutating controlled rectifier switching to its forward conducting state.

5. The power supply means of claim 4 including at least two unidirectionally conducting means each of which is connected across a different series combination of main controlled rectifier and associated uncontrolled rectifier in opposed polarity, parallel circuit relationship therewith.

6. The power supply means of claim 5 in which said unidirectionally conducting means comprise controlled rectifiers each of which is switchable from a blocking state to a forward conducting state when triggered.

7. The power supply means of claim 6 including control means for triggering each of the unidirectionally conducting means a predetermined short time interval after a turn-on control signal is supplied to the main controlled rectifier associated therewith.

8. The power supply means of claim 6 including control means for triggering each of the unidirectionally conducting means a predetermined short time interval after a turn-off control signal is supplied to the commutating controlled rectifier with which the associated main controlled rectifier is interconnected.

9. The power supply means of claim 5 including saturable reactor means connected between said first set of input terminals and said main rectifiers for impeding any current tending to flow from said second set of input terminals to said first set of terminals via either main controlled rectifier and the unidirectionally conducting means associated therewith.

10. The power supply means of claim 4 in which the control singals for the controlled rectifiers are programmed to cause the rectifiers to switch to their forward conducting states in the following repetitive order:
the first main controlled rectifier,
the first commutating controlled rectifier,
the other main controlled rectifier,
the second commutating controlled rectifier.

11. The power supply means of claim 4 in which said first and second sets of input terminals are actually connected to first and second electric power rectifying apparatus each of which in turn is adapted to be connected to a common AC electric power supply of substantially constant frequency.

12. The power supply means of claim 11 in which the rectifying apparatus to which said second set of input terminals is connected is a 3-phase double-way bridge whose AC terminals are connected to star-connected secondary windings of a constant voltage transformer having delta-connected primary windings adapted to be connected to said AC electric power supply.

13. The power supply means of claim 4 in which the voltage magnitude of said main source of power is variable and the voltage magnitude of said auxiliary source of power is relatively fixed.

14. The power supply means of claim 13 including frequency control means for varying the frequency of the control signals that are supplied to said controlled rectifiers and also including means for varying the voltage magnitude of said main source in unison with variations of said frequency control means.

15. The power supply means of claim 4 in which there are:
(b') at least two pairs of main controlled rectifiers;
(f') an additional oscillatory circuit comprising a second inductor connected in series with a second capacitor;
(g') at least third and fourth commutating controlled rectifiers;
(k) a third set of input terminals adapted to be connected to another auxiliary source of DC electric power;
(l) means including said third and fourth commutating controlled rectifiers for electrically connecting said third set of input terminals to said additional oscillatory circuit which consequently is energized by the other auxiliary source of power when either one of said third and fourth commutating controlled rectifiers is in a forward conducting state;
(m) means for serially interconnecting said third commutating controlled rectifier, said additional oscillatory circuit, and a third one of said main controlled rectifiers so that forward conduction by the latter will be extinguished in response to said third commutating controlled rectifier switching to its forward conducting state; and
(n) means for serially interconnecting said fourth commutating controlled rectifier, said additional oscillatory circuit, and the fourth main controlled rectifier so that forward conduction by the latter will be extinguished in response to said fourth commutating controlled rectifier switching to its forward conducting state.

16. The power supply means of claim 4 in which there are:
(b') a second pair of main controlled rectifiers, the first main controlled rectifiers of both of said pairs being connected in parallel circuit relationship with each other and being arranged substantially simultaneously to receive their respective turn-on control signals, and the other main controlled rectifiers of both of said pairs being connected in parallel circuit relationship with each other and being arranged substantially simultaneously to receive their respective turn-on control signals;
(f') an additional oscillatory circuit comprising a second inductor connected in series with a second capacitor;
(k) means including said first and second commutating controlled rectifiers for electrically connecting said second set of input terminals to said additional oscillatory circuit which consequenlty is energized by said auxiliary source of power when either one of said commutating controlled rectifiers is in a forward conducting state;

(l) means for serially interconnecting said first commutating controlled rectifier, said additional oscillatory circuit, and the first main controlled rectifier of said second pair so that forward conduction by the latter will be extinguished in response to said first commutating controlled rectifier switching to its forward conducting state; and (m) means for serially interconnecting said second commutating controlled rectifier, said additional oscillatory circuit, and the other main controlled rectifier of said second pair so that forward conduction by the latter will be extinguished in response to said second commutating controlled rectifier switching to its forward conducting state.

17. An inverter circuit including in combination:
(a) at least one pair of alternately triggered controlled rectifiers connected in series with each other to form a load current conducting circuit having an intermediate point located inbetween said controlled rectifiers;
(b) another pair of alternately triggered commutating controlled rectifiers connected in series with each other and in parallel circuit relationship with said first-mentioned pair across a first source of DC voltage of relatively fixed magnitude;
(c) a capacitor connected in series with at least one inductor between said intermediate point and the respective commutating controlled rectifiers;
(d) at least two pairs of series-connected diodes, each of said diode pairs being connected in parallel circuit relationship across a different one of the controlled rectifiers of said first-mentioned pair is opposed polarity relationship therewith;
(e) a second source of DC voltage of variable magnitude connected between the responsive junctions of the diodes comprising each of said diode pairs; and
(f) a load operatively connected between said load current conducting circuit and said second source of voltage.

18. An improved electric power inventer of the impulse commutated type, which inverter employs at least one pair of alternately triggered main controlled rectifiers to energize an AC load from a main source of variable-magnitude DC voltage, a plurality of load-current conducting diodes in series with the main controlled rectifiers, respectively, and a high-frequency oscillatory circuit connected to an auxiliary source of relatively fixed-magnitude commutating voltage and arranged to effect turn off of the respective main controlled rectifiers on command, wherein the improvement comprises the provision of another pair of controlled rectifiers which are respectively connected across the series combinations of main controlled rectifiers and associated diodes in opposed polarity, parallel circuit relationship therewith.

19. An improved electric power inverter of the impulse commutated type, which inverter employs at least one pair of alternately triggered main controlled rectifiers to energize an AC load from a DC voltage supply, a common relatively high-frequency oscillatory circuit and means including first and second alternately triggered commutating controlled rectifiers for interconnecting the oscillatory circuit and the respective main controlled rectifiers, whereby the latter rectifiers are turned off by turning on the corresponding commutating controlled rectifiers, wherein the improvement comprises the provision of at least two feedback controlled rectifiers respectively shunting the main controlled rectifiers, each feedback rectifier being poled oppositely to the main rectifier that it shunts and being triggered after the corresponding commutating controlled rectifier is turned on.

References Cited
UNITED STATES PATENTS

| | | | |
|---|---|---|---|
| 3,164,767 | 1/1965 | Morgan | 321—45 X |
| 3,207,974 | 9/1965 | McMurray | 321—45 |
| 3,328,667 | 6/1967 | Shaneman | 321—45 |
| 3,354,370 | 11/1967 | Corry et al. | 321—45 X |
| 3,355,654 | 11/1967 | Risberg | 321—44 |
| 3,384,804 | 5/1968 | Salihi | 321—5 |
| 3,392,318 | 7/1968 | Huntzinger | 321—45 X |
| 3,414,800 | 12/1968 | Sheldrake et al. | 321—5 |

JOHN F. COUCH, Primary Examiner

W. H. BEHA, Jr., Assistant Examiner

U.S. Cl. X.R.

318—227; 321—45